Inventor
Harry Phillips

Patented Oct. 10, 1950

2,524,927

UNITED STATES PATENT OFFICE 2,524,927

APPARATUS FOR TRANSMITTING THE ANGULAR MOVEMENT OF A PERISCOPE TO AN INDICATING STATION

Harry Phillips, Beverly, Mass., assignor to United Shoe Machinery Corporation, Flemington, N. J., a corporation of New Jersey Application May 27, 1946, Serial No. 672,433

3 Claims. (Cl. 88—69)

This invention relates to apparatus for use in transmitting angular or rotary movement and is herein illustrated in its application to the combination of a shaft mounted for rotary and endwise movement with an electrical system for the transmission of such rotary movement. Such a system is disclosed in United States Letters Patent No. 1,612,117, granted December 28, 1926, on an application filed in the names of Hewlett et al. This patent discloses a system commonly known as the "selsyn system" and is characterized by transmitting and receiving devices each provided with a single phase or single circuit field winding and a polyphase or polycircuit armature winding, the armature windings being interconnected. Such a system is self-synchronous and may be employed to transmit angular or rotary movements, such as the rotary movement of a shaft, to an indicating means located remotely from said shaft.

In my United States Letters Patent No. 2,490,918, granted December 13, 1949, there is illustrated an apparatus for use in submarines to transmit the angular or rotary movement of the periscope. Said apparatus transmits the angular movement of the periscope to receiving devices which indicate the periscope movement in terms of degrees of angular movement of the line of sight of an observer through the periscope relatively to the lubber line of the submarine. Said apparatus includes an actuator illustrated as a gear surrounding the periscope and journaled in a fixed housing. The angular movement of the periscope is imparted to said gear through a spline mounted in a suitable splineway in the periscope. While this apparatus has been generally satisfactory the provision of a splineway in the periscope makes it difficult to prevent the seepage of sea water into the submarine upon the surface of the periscope when the submarine is submerged. This difficulty has been minimized by providing the smallest possible splineway consistent with reliable operation of the apparatus but the use of such a splineway necessitates frequent changing of the splines which, because of their small size, cannot withstand any considerable wear.

It is an object of the present invention to provide an improved apparatus for transmitting the angular movement of a periscope through a "selsyn system" to an indicating station whereby the angular movement of the periscope may be transmitted without providing a splineway or the like therein.

With the above object in view the present invention in one aspect thereof consists in the combination with a periscope, constructed and arranged for rotary and endwise movements, of a synchronous generator for transmitting the rotary movement of the periscope, a fixed mounting for said generator, an actuator for said generator secured to the periscope, a shaft driven by said actuator, a bearing for said shaft constructed and arranged to move with the periscope during its endwise movement while held against rotary movement with the periscope, a train of mechanism operatively connecting said shaft to said generator, a synchronous motor actuated by said generator, and periscope bearing indicating means actuated by said motor. The illustrated driving shaft is slidably mounted in the hub of the driven member and is of a noncylindrical structure to the end that its rotation will be imparted to the driven member. The illustrated driving shaft is square in cross section but it will be understood that other known types of construction, whereby a shaft slidably mounted in a driven member is actuated to drive said member, come within the scope of the present invention.

The invention will now be described with reference to the accompanying drawings and pointed out in the appended claims.

Figure 1:
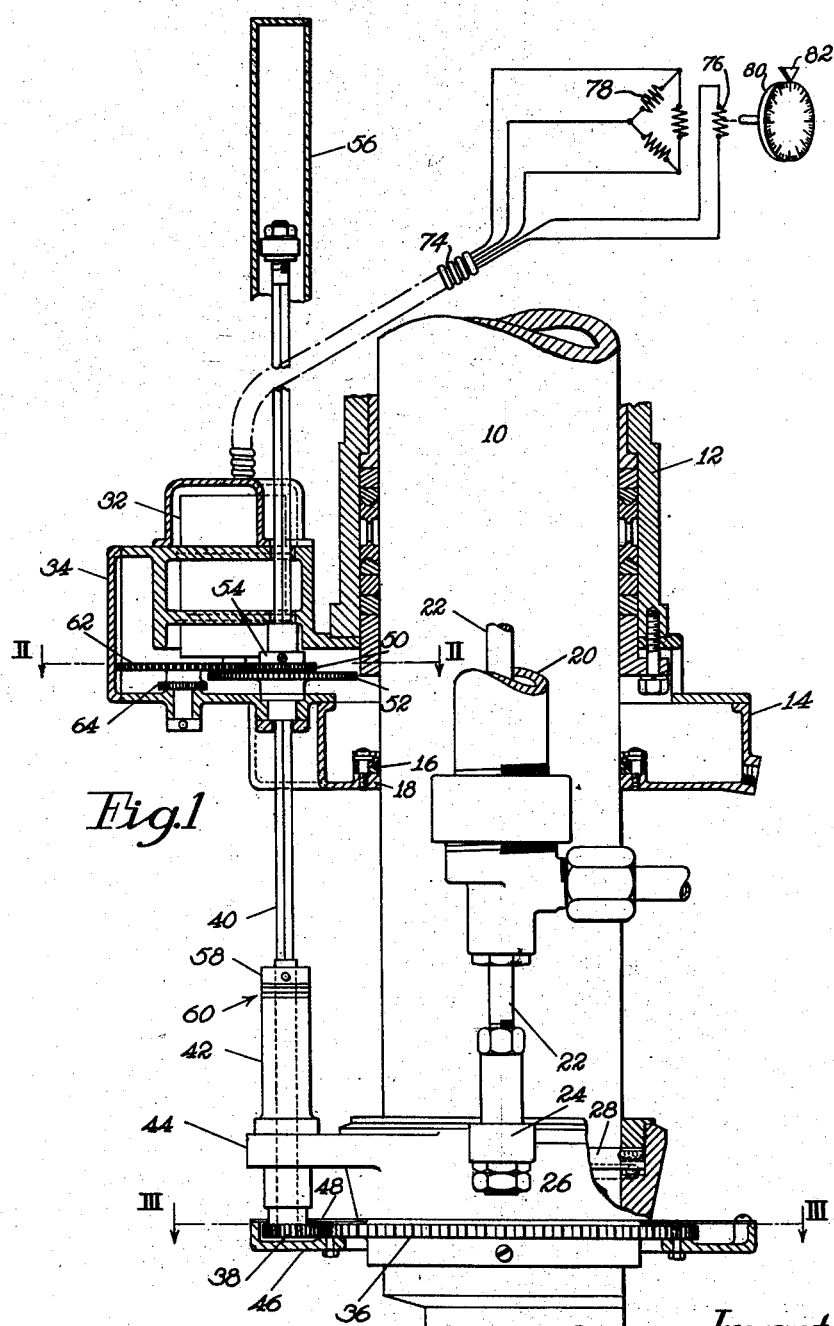
Fig. 1 is a front elevation illustrating a portion of a periscope of the type commonly provided in submarines and transmission mechanism embodying the features of the present invention, certain parts being shown in section on a plane common to the axis of the periscope.

Referring to Fig. 1, a shaft or periscope 10 extends upwardly through a housing 12 mounted in a dome in the hull of a submarine (not shown). For preventing the entrance of sea water, packings of any known construction are provided between the periscope and the housing, and the small amount of water which seeps through the packings flows into a tank 14 from which it is piped to the bottom of the hull of the submarine. Inasmuch as the outer surface of the illustrated periscope is not broken by a splineway, or other irregularity, which might provide a duct for the ingress of sea water, relatively little seepage will occur. The small amount of water which seeps through the packings usually flows down the periscope and is largely directed away from the periscope by an endless wiper 16 secured to a raised annular portion 18 in the base of the tank. The illustrated periscope is elevated by hydraulic mechanism of known construction including two cylinders one of which is indicated by the numeral 20 in Fig. 1, the piston operating in said cylinder being indicated by the numeral 22. The piston 22 is mounted in an ear 24 projecting from a ring 26 mounted on the periscope. The periscope is free to turn in the ring the orientation of which is held constant by the hydraulic cylinders. The ring is held against movement endwise of the periscope by a collar 28 secured to the periscope and mounted in a counter bore in the ring.

The lower portion of the periscope, which is not illustrated in the drawings, mounts the usual eye piece and two hand levers which in their operative position project radially in opposite directions from the periscope and are conveniently arranged to enable the observer to rotate the periscope at will.

Figure 2:
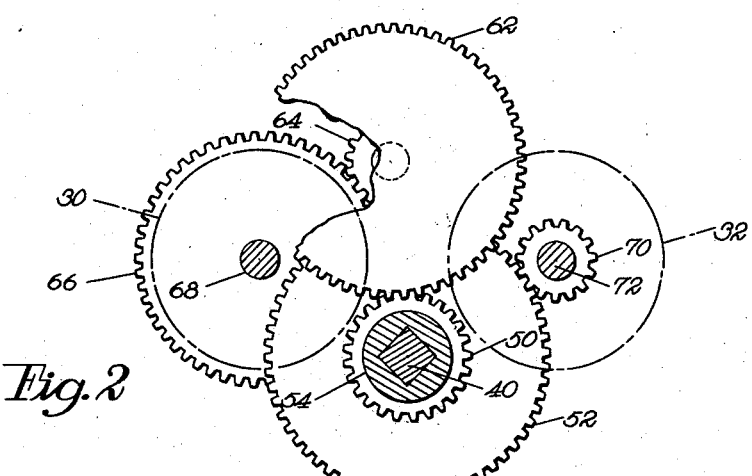
Fig. 2 is a section on the line II—II of Fig. 1.
Figure 3:
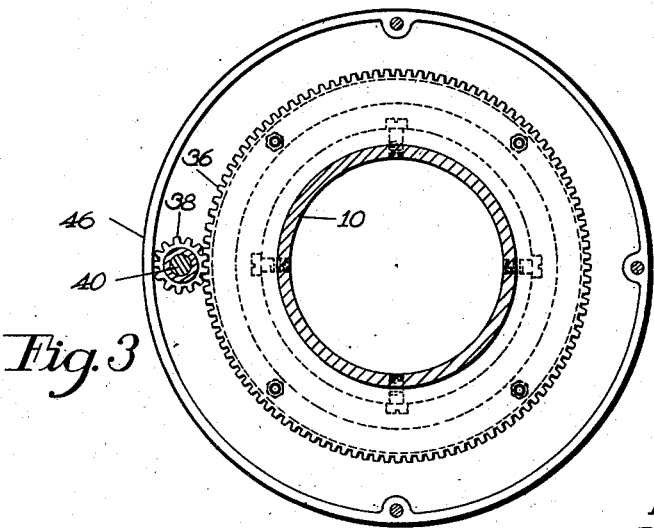
Fig. 3 is a section on the line III—III of Fig. 1.

For transmitting the rotary movement of the periscope to an indicating mechanism in the submarine two synchronous generators 30 and 32, the relative position of which is diagrammatically indicated in Fig. 2, are mounted in a housing 34 (Fig. 1), said housing being secured to the housing 12. For transmitting the rotary movement of the periscope to the generators 30 and 32 a spur gear 36 is secured to the periscope and arranged to mesh with a pinion 38 fixed to the lower end portion of a shaft 40 journaled in a bearing 42 mounted in an ear 44 projecting radially from the ring 26. A suitable guard in the form of an annular plate 46 is secured to the gear 36 and arranged to extend outwardly beneath the pinion 38. The plate 46 has an upturned rim which surrounds the gear 36 and the pinion 38 and provides a mounting for a cover plate 48. The shaft 40 actuates two gears 50 and 52 mounted in the housing 34, said gears being mounted on a common hub 54 which is held against vertical movement by portions of the housing. The shaft 40 slides freely through the hub 54 during the endwise movement of the periscope, the upper portion of said shaft being received within a suitable watertight chamber provided by a hollow standard 56 projecting upwardly from the deck of the submarine and into the superstructure surrounding the exposed portion of the periscope. In the illustrated organization that portion of the shaft 40 which slides through the hub 54 is made square in cross section in order that the rotary movement of said shaft will be imparted to the hub which has a square hole in which said shaft is slidably mounted. For supporting the weight of the shaft 40 and the pinion 38 a collar 58 is secured to the cylindrical portion of the shaft and arranged to engage thrust washers 60 mounted on the upper end face of the bearing member 42. Referring to Fig. 2 the small gear 50 meshes with a spur gear 62. Mounted to rotate with the gear 62 is a pinion 64 which meshes with a spur gear 66 mounted on a downward extension of a shaft 68 which mounts the synchronous generator 30. The ratio of the gearing above described is such that the generator 30 is rotated at a 1:1 ratio to the periscope. The large gear 52 meshes with a pinion 70 secured to a downward extension of a shaft 72 which mounts the synchronous generator 32, said generator being rotated at a ratio of 36:1 to the periscope. The rotation of the generator 32 is transmitted through an electrical conductor 74 to a synchronous motor at the indicating station, said motor being diagrammatically illustrated in Fig. 1 by field windings 76 and armature windings 78. The rotation of the motor is transmitted to a rotary dial 80 which is mounted to rotate relatively to a stationary pointer 82. The rotation of the dial 80 provides a fine reading of the position of the periscope in rotation. Similarly the rotation of the generator 30 is transmitted through suitable electrical connections (not shown) to a synchronous motor at the indicating station, said motor actuating suitable indicating mechanism which provides a coarse reading of the position of the periscope in rotation.

Having thus described my invention, what I claim as new and desire to secure by Letters Patent of the United States is:

1. The combination with a periscope constructed and arranged for endwise and rotary movements, of a synchronous generator for transmitting the rotary movement of the periscope, a fixed mounting for said generator, an actuator for said generator fixed to the periscope, a shaft driven by said actuator, a bearing for said shaft constructed and arranged to move with the periscope during its endwise movement while held against rotary movement with the periscope, a train of mechanism operatively connecting said shaft to said generator, a synchronous motor actuated by said generator, and periscope bearing indicating means actuated by said motor.

2. The combination with a periscope constructed and arranged for endwise and rotary movements, of a synchronous generator for transmitting the rotary movement of the periscope, a fixed mounting for said generator, an actuator for said generator fixed to the periscope, a shaft driven by said actuator, a bearing for said shaft constructed and arranged to move with the periscope during its endwise movement while held against rotary movement with the periscope, a train of mechanism operatively connecting said shaft to said generator, a housing for receiving said shaft, a synchronous motor actuated by said generator, and periscope bearing indicating means actuated by said motor.

3. The combination with a periscope constructed and arranged for rotary and endwise movements, of a synchronous generator for transmitting the rotary movement of the periscope, an actuator fixed to the periscope, a shaft driven by said actuator, a bearing for said shaft constructed and arranged to move with the periscope during its endwise movement while held against rotary movement with the periscope, said bearing being constructed and arranged to cause the shaft to move endwise with the periscope, a train of mechanism whereby said shaft is operatively connected to said generator, a synchronous motor actuated by said generator, and periscope bearing indicating means actuated by said motor.

HARRY PHILLIPS.

REFERENCES CITED

The following references are of record in the file of this patent:

UNITED STATES PATENTS

| Number | Name | Date |
| --- | --- | --- |
| 1,177,382 | Cashman | Mar. 28, 1916 |
| 1,203,151 | Sperry | Oct. 31, 1916 |
| 1,897,282 | Steinle | Feb. 14, 1933 |
| 2,039,728 | Lundeil et al. | May 5, 1936 |
| 2,230,716 | Curtis | Feb. 4, 1941 |
| 2,371,524 | Kals | Mar. 13, 1945 |
| 2,418,799 | Willard | Apr. 8, 1947 |

FOREIGN PATENTS

| Number | Country | Date |
| --- | --- | --- |
| 464,306 | Great Britain | Apr. 15, 1937 |